United States Patent [19]
Foster et al.

[11] Patent Number: 5,696,442
[45] Date of Patent: Dec. 9, 1997

[54] ROTATIONAL VELOCITY SENSOR RING APPARATUS AND METHOD

[75] Inventors: David Alden Foster, Castalia; Debbie Sue Wadsworth-Dubbert, Port Clinton, both of Ohio

[73] Assignee: General Motors Corporation, Detroit, Mich.

[21] Appl. No.: 684,960

[22] Filed: Jul. 19, 1996

[51] Int. Cl.⁶ ........................................ G01P 3/488
[52] U.S. Cl. ............ 324/173; 324/207.25; 310/168; 310/155; 29/592.1
[58] Field of Search ............. 324/207.2, 207.21, 324/207.22, 207.25, 207.15, 262, 163, 166, 173, 174; 29/592.1, 596, 598; 74/449, 439, 434, 458; 188/181 R; 310/155, 156, 168

[56] References Cited

U.S. PATENT DOCUMENTS

| | | | |
|---|---|---|---|
| 3,626,226 | 12/1971 | Pauwels | 310/168 |
| 3,801,845 | 4/1974 | Gavitt, Sr. | 310/168 |
| 4,002,937 | 1/1977 | Anson | 310/168 |
| 4,529,933 | 7/1985 | Bleeke | 324/173 |
| 4,795,278 | 1/1989 | Hayashi | 384/448 |
| 4,916,390 | 4/1990 | Christoleit et al. | 324/174 |
| 4,940,936 | 7/1990 | Grillo et al. | 324/174 |
| 4,940,937 | 7/1990 | Hattori et al. | 324/207.22 |
| 5,004,358 | 4/1991 | Varvello et al. | 384/446 |
| 5,111,138 | 5/1992 | Kramer | 324/174 |

*Primary Examiner*—Sandra L. O'Shea
*Assistant Examiner*—Jay M. Patidar
*Attorney, Agent, or Firm*—Anthony Luke Simon

[57] ABSTRACT

A rotational velocity sensor ring comprising a circular cylindrical body with a radially interior cylindrical surface, a radially exterior cylindrical surface and first and second cylinder ends, a plurality of substantially equally spaced, substantially equal length fingers extending from the first cylinder end, and on each of the fingers, a substantially 180° bend proximate to the first cylinder end, wherein each finger is radially exterior of the circular cylindrical body, wherein each finger has a finger end extending toward a second cylinder end opposite the first cylinder end, wherein each finger is proximate to the radially exterior cylindrical surface and parallel to a cylinder axis of the circular cylindrical body, wherein the fingers comprise a set of teeth of the rotational velocity sensor ring.

6 Claims, 2 Drawing Sheets

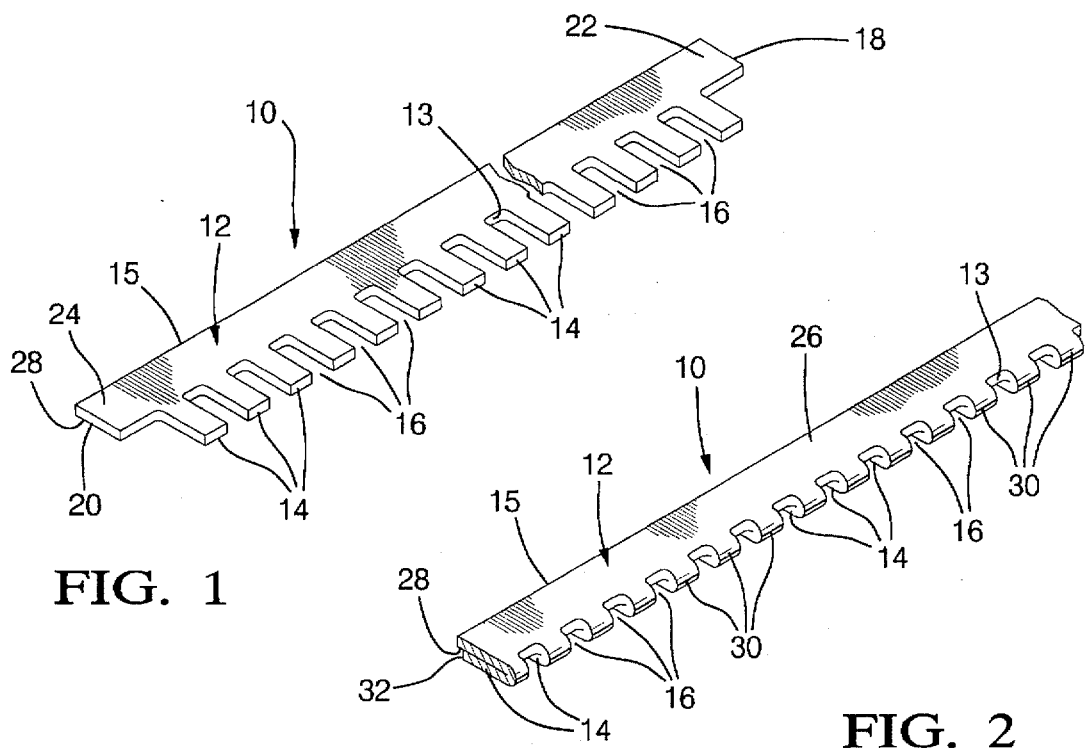
FIG. 1
FIG. 2
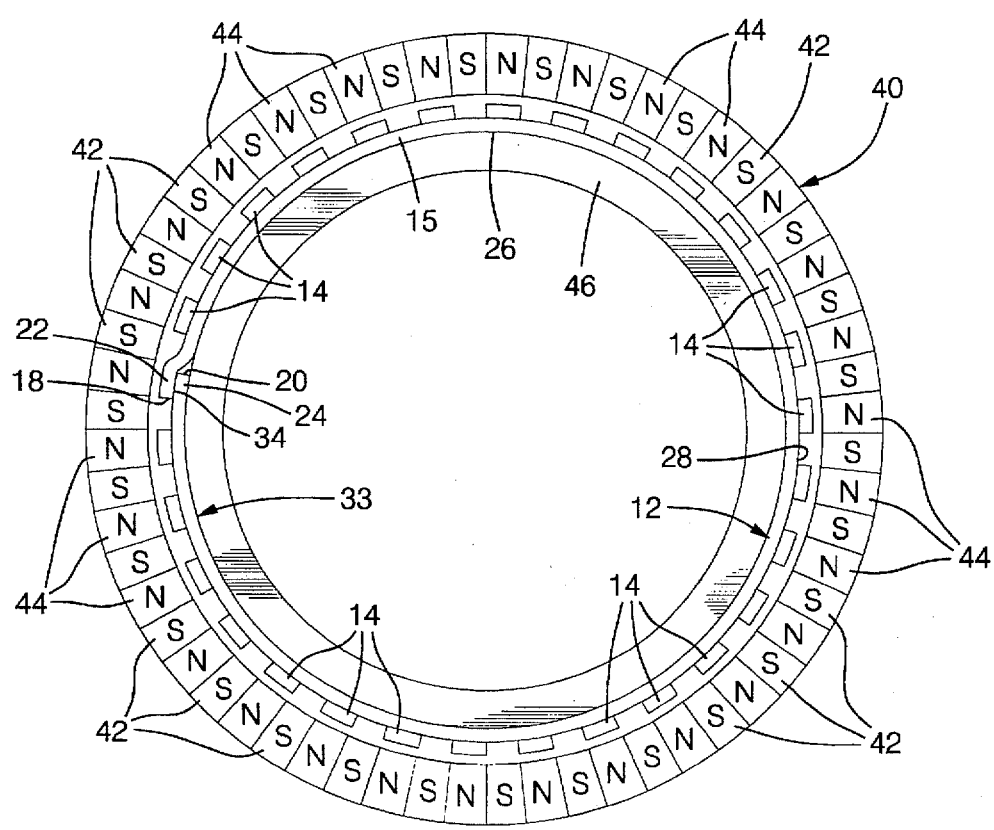
FIG. 3

ROTATIONAL VELOCITY SENSOR RING APPARATUS AND METHOD

This invention relates to a rotational velocity sensor ring apparatus and method of manufacture.

BACKGROUND OF THE INVENTION

In a known manner of sensing rotational velocity of a rotating body, a sensor ring, also known as an encoder ring, exciter ring or tone ring, is mounted so that it rotates with the rotating body. A variable inductance or variable reluctance sensor is mounted concentrically around the sensor ring or, alternatively, proximate to one portion of the exterior of the sensor ring. The sensor is fixedly mounted and does not rotate with the sensor ring. The sensor includes circuitry configured to provide an output signal that varies with the rotational velocity of the sensor ring. Typically, as the rotational velocity of the sensor ring increases, the frequency of the output signal increases.

One known type of sensor ring comprises a machined or pressed metal ring with extending teeth substantially equally spaced around the outside perimeter of the ring. The sensor is configured so that when the ring is in certain positions, each tooth lines up with one or more poles of the sensor. When the ring is then turned from that position so that the teeth are no longer directly aligned with the pole, the sensor detects a change in inductance or reluctance of the magnetic circuit including the sensor poles and the sensor ring. It is through detecting such changes in inductance or reluctance that rotational velocity sensors operate.

One family of rotational velocity sensors known to those skilled in the art includes a plurality of poles spaced apart so that, in one position of the sensor ring, each pole of the plurality of poles aligns with a tooth on the sensor ring. In some of these sensors, the poles extend circumferentially 360° around the ring so that there is one pole for each tooth on the ring. The benefit of such sensors is increased signal strength and increased signal to noise ratio. Construction of the poles and signal processing circuitry for both variable reluctance and variable inductance sensors are well known to those skilled in the art.

SUMMARY OF THE INVENTION

The rotational velocity sensor ring apparatus according to this invention is characterized by the features specified in claim 1.

Advantageously, this invention provides rotational velocity sensor ring that eliminates the need for machining the ring teeth or forming the ring from powdered metal. Advantageously, this invention provides a rotational velocity sensor ring that can be formed from stamped metal, thus eliminating machining or powder metal forming of the ring.

Advantageously, this invention provides a rotational velocity sensor ring that can be formed from stamped metal in an efficient manner with little waste of material and with very few processing steps. Advantageously, this invention provides a rotational velocity sensor ring that can serve as a direct substitute for a machined or powder metal sensor ring in an existing rotational velocity sensor.

Advantageously, in one example, this invention provides a rotational velocity sensor ring apparatus comprising a circular body with a radially interior cylindrical surface, a radially exterior cylindrical surface and first and second cylinder ends, a plurality of substantially equally spaced substantially equally length fingers extending from the first cylinder end, and, on each of the fingers, a 180° bend proximate to the first cylinder end wherein each finger is radially exterior of the circular cylindrical body, proximate to the radially exterior cylindrical surface and substantially parallel to a cylinder axis of the circular cylindrical body, wherein the fingers comprise a set of teeth for the rotational velocity sensor. The sensor ring apparatus advantageously provides the variable surface formed by the fingers on the radially outer surface and a continuous inner surface allowing good magnetic coupling and completion of a magnetic path for a sensor.

BRIEF DESCRIPTION OF THE DRAWINGS

The present invention will now be described by way of example with reference to the accompanying drawings in which:

FIG. 1 is a perspective view that illustrates a elongated stamped section of metal for use in fabricating a sensor ring according to this invention;

FIG. 2 is a perspective view that illustrates the member of FIG. 1 after having been processed according to this invention;

FIG. 3 illustrates a sensor with a sensor ring according to this invention;

DETAILED DESCRIPTION OF THE INVENTION

EXAMPLE 1

Figure 4:
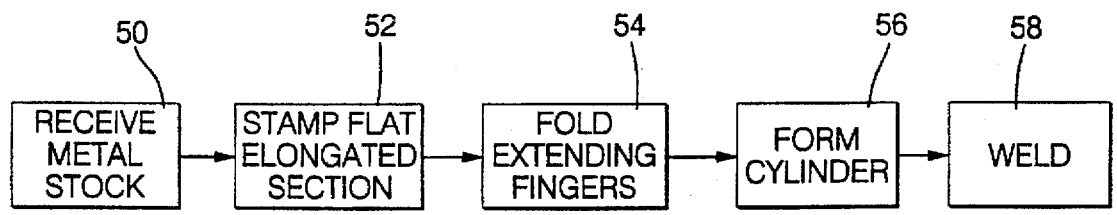
FIG. 4 illustrates a method of manufacture according to this invention.

Referring to FIGS. 1–3, the elongated body 12 shown is a flat blank 10 stamped from sheet metal stock into the shape shown using a single stamping operation. Blank 10 comprises a metal with Ferro-magnetic properties, such as steel, so that the final sensor ring according to this invention can work in both variable reluctance and variable inductance sensors. The blank has a body 12 with a first end 18 and a second end 20 and a series of teeth 14 extending from a first edge 13 of the body. The teeth 14 are substantially equally spaced by spaces 16 and extend from the first end 18 to the second end 20. At the first end 18 and the second end 20, end portions 22 and 24 of the body 12 extend lengthwise from the body 12 without teeth protruding therefrom. The purpose of end portions 22 and 24 will be explained further below.

FIG. 2 illustrates an end view of the blank 10 after the fingers 14 have been bent 180° toward the side 15 of the body 10. The fingers 14 are proximate to or preferably lying against the flat surface 28 of the body 12. After the fingers 14 are bent, each finger has one end with a substantially 180° bend 30 protruding from edge 13 of the body 12 and a second end 32 extending toward edge 15 of body 12 opposite edge 13 and against flat side 28.

FIG. 3 illustrates the sensor including a sensor ring 33 after the blank 10, having the fingers bent as shown in FIG. 2, is rolled into a cylindrical shape and maintained in that shape by fastening ends 18 and 20 together. In the example shown, the ends 18 and 20 are connected with a lap weld 34 in overlying end portions 22 and 24. When the blank is rolled into a cylinder, the teeth 14 are on the radial exterior of the ring 33 and the surface 26 forms the inner cylindrical surface of the sensor ring with surface 28 forming the radially exterior cylindrical surface.

As shown in FIG. 3, the teeth 14 of the sensor ring 33 are equally spaced about the sensor ring 33 except in the position where the ring is joined together by lap weld 34. At that position, there is no tooth 14. In an alternative example, the ends 20 and 18 are joined by a butt weld, in which case, it may not be necessary to omit one of the teeth 14.

That a tooth 14 is omitted at the weld 34 in FIG. 3 is irrelevant to the operation of the speed sensor. The sensor shown includes a plurality of poles 42 and 44 in the sensor body 40 that, in a manner known to those skilled in the art, sense the movement of the sensor ring teeth 14 past the poles 42, 44, sensing the relative rotational velocity between the ring 33 and the sensor body 40. Because the plurality of poles are used, the output signal from the sensor body 40 obtained is a result of all the teeth 14 interacting with the poles 42, 44. Thus, the omission of a single tooth has a negligible impact on the output signal of the sensor and does not adversely affect the rotational velocity output signal.

In the embodiment shown in FIG. 3, the ring 33 is pressed onto cylindrical body 46 for support. The body 46 may be metal, plastic, or any other suitable material or may be part of the structure of the apparatus whose rotational velocity is being sensed. Through the press fit, friction between the radially exterior surface of body 46 and the interior cylindrical surface 26 of sensor ring 33 maintains the ring 33 in position.

In the example shown, by sizing the body 46 properly so that the combination of ring 33 and body 46 are of size and shape to substantially match a powder metal or machined ring in an existing rotational velocity sensor, the combination of the ring 33 and the body 46 can serve as a substitute for the machined or powder metal ring in the existing sensor.

Referring now to FIG. 4, an example method of manufacture of the sensor ring shown in FIG. 3 is illustrated. At step 50, the Ferro-magnetic sheet metal stock is received. The sheet metal typically is received in the form of rolls and, when the metal is drawn from the roll, enters the process as a substantially flat metal stock. The metal may be specially heat treated in a known manner to enhance magnetic performance, but such treatment is not necessary. At step 52, an elongated section such as shown in FIG. 1 is stamped from the flat metal stock. At step 54, the fingers 14 are folded 180°, which may require two stamping steps, to form the intermediary structure shown in FIG. 2. At step 56, the structure from step 54 is rolled into a cylindrical shape with the teeth 14 at the radially exterior position with respect to the body 12 and, at step 58, the ends of the structure are welded together to maintain the structure in the cylindrical shape. Those skilled in the art will immediately recognize the advantages of the manufacturing process shown over those prior art processes that require fairly complex molds for powder metal parts or machining of stock metal parts.

The sensor ring structure similar to that shown in FIG. 3 can alternatively be manufactured by a method not claimed as part of this invention as follows. The flat metal stock is received and, at a first station, the cylindrical cup portion comprising the body 12 of the sensor ring is drawn from the flat metal stock so that the cup portion extends perpendicularly from the stock. This step also includes stamping out the end of the cup so that the end does not have a solid wall. At a next station, the majority of the fingers are stamped so that the fingers are separated from the stock and extend perpendicularly from the drawn cup. It may be beneficial to leave some fingers or some strips of metal attached to the stock so that the structure can continue as part of the stock and move down the manufacturing line as part of the stock.

At a next station, the fingers that have been cut are bent 90° so that they are lying against the radially exterior surface of the cup. At a final station the remaining connecting metal between the structure and the metal stock is cut and, if the remaining metal comprised teeth, the teeth are bent 90° against the exterior of the structure. It has been found that with the cutting and bending of the remaining teeth, it is difficult to maintain length control of these teeth with the same precision as the teeth first cut from the stock. However, when the sensor ring is used in a multiple pole sensor, that some teeth, for example 3, are slightly shorter than the remainder of the teeth has negligible effect on the sensor output signal.

EXAMPLE 2

Figures 5, 6:
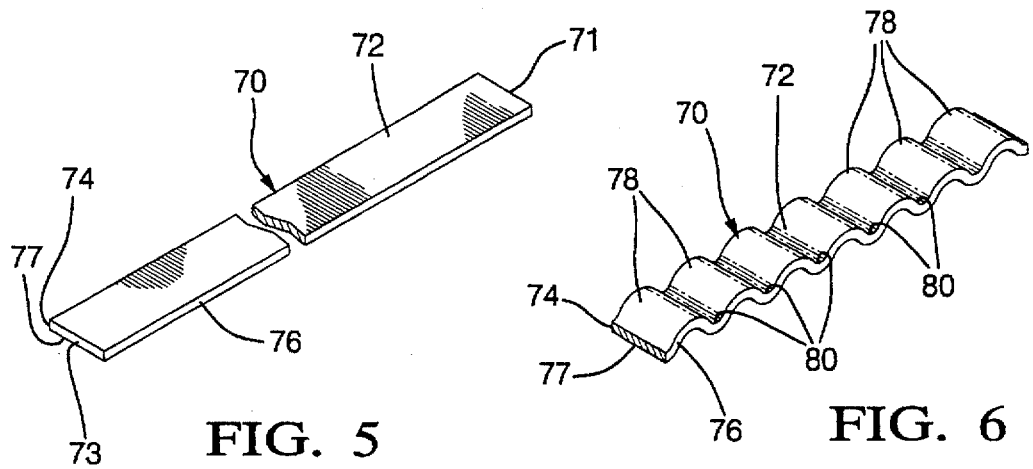
FIG. 5 is a perspective view that illustrates a second example flat stamped member according to this invention.
FIG. 6 is a perspective view that illustrates the member shown in FIG. 5 after it has been processed according to this invention.

Referring now to FIG. 5, a blank 70 is stamped from a flat Ferro-magnetic metal stock and generally comprises an elongated rectangular body as shown. The blank 70 has a first end 71, a second end 73, a flat surface 72, an opposing flat surface 77 and first and second edges 74 and 76.

Referring to FIG. 6, the blank 70 has been stamped so that, from the view shown, it appears to have equally spaced waves having, with reference to side 72, a series of raised portions 78 and valleys 80. The profile stamped into blank 70 may vary over wide range of wave shapes. It is preferable that the shape obtained be achieved in a single stamping process. The raised portions 78 are substantially evenly spaced so that, when the ring is formed, the raised portions 78 align, in certain ring positions, with the poles of the sensor.

Figure 7:
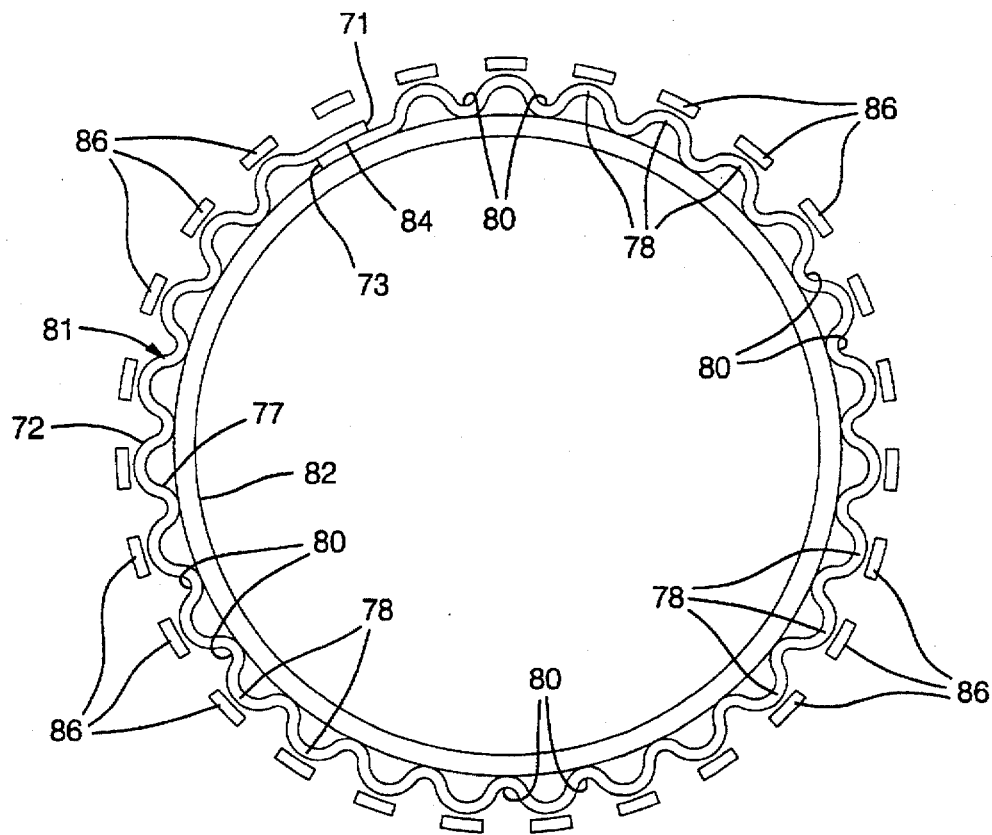
FIG. 7 illustrates a sensor with a second example sensor ring according to this invention.

Referring now to FIG. 7, the sensor is shown including the sensor ring 81 after the blank 70 in FIG. 6 has been drawn into a circular cylinder with raised portions 78 at the radial exterior of the cylinder. The ring 81 is maintained in the cylindrical shape by a weld 84 joining ends 71 and 73. As shown in FIG. 7, the weld 84 is a lap weld and occurs at a position at which a raised portion 78 is omitted from the substantially equally spaced pattern of raised portions 78 around the ring 81. The raised portions 78 perform the function that the teeth perform in the prior art powder metal or machined part. More particularly, the ring 81 provides one inductance or reluctance circuit for the poles 86 when the raised portions 78 are aligned with the poles 86. The ring 81 varies that inductance or reluctance circuit when the raised portions 78 are not aligned with the poles 86. Cylindrical structure 82 provides structural support for the ring 81 and may comprise a metal or plastic cylinder or may be an integral part of the body whose rotational velocity is being sensed. The ring 81 is friction fit to the structure 82.

While the sensor pole structures in FIGS. 3 and 7 have been shown only schematically, their detail structure is well within the level of those skilled in the art and need not be set forth herein in further detail.

An example sensor ring was constructed according to FIG. 7 and tested in a multiple pole sensor. The output of the sensor including the ring shown in FIG. 7 was evaluated and it was found the signals obtained using the sensor ring according to this invention are well within acceptable levels of output signals for a universal rotational velocity sensor. These advantageous results were obtained while also providing the advantages of eliminating the necessity of a powder metal or a machined sensor ring.

We claim:

1. A rotational velocity sensor ring comprising:

a circular cylindrical body with a radially interior cylindrical surface, a radially exterior cylindrical surface and first and second cylinder ends;

a plurality of substantially equally spaced, substantially equal length fingers extending from the first cylinder end; and on each of the fingers, a substantially 180° bend proximate to the first cylinder end, wherein each finger is radially exterior of the circular cylindrical body, wherein each finger has a finger end extending toward a second cylinder end opposite the first cylinder end, and wherein each finger is proximate to the radially exterior cylindrical surface and parallel to a cylinder axis of the circular cylindrical body, wherein the fingers comprise a set of teeth for the rotational velocity sensor ring.

2. A rotational velocity sensor ring according to claim 1 wherein each finger is bent so that it is in physical contact with the radially exterior cylindrical surface.

3. A rotational velocity sensor ring according to claim 1 wherein the fingers are equally spaced except for at one position around the circular cylindrical body, wherein the circular cylindrical body is welded at said one position.

4. A rotational velocity sensor ring according to claim 1 also comprising a supporting cylinder body concentric with the circular cylindrical body and radially interior thereof, wherein the circular cylindrical body is maintained in place on the supporting cylinder body through a friction fit between an exterior supporting surface of the supporting cylinder body and the radially interior cylindrical surface.

5. A method of manufacturing a rotational velocity sensor ring comprising the steps of:

receiving a flat Ferro-magnetic metal stock;

stamping a flat elongated section of the stock where the elongated section comprises an elongated narrow body portion with a first end and a second end and a series of extending fingers substantially equally spaced along the length of the narrow body portion between the first and the second ends;

folding the extending fingers substantially 180° over the body portion wherein all of the fingers are folded over one side of the body portion;

curving the elongated section into a cylindrical shape wherein the fingers are radially exterior of the body portion; and fastening the first and second ends to maintain the cylindrical shape.

6. A method of manufacturing a rotational velocity sensor ring according to claim 5 also comprising the step of pressing the section of the stock in the cylindrical shape over a supporting cylinder body.

* * * * *